United States Patent [19]
Henning

[11] 3,941,185
[45] Mar. 2, 1976

[54] HEAT ACCUMULATOR

[76] Inventor: Erik E. Henning, Harrhagsvagen 65, S-122 40 Enskede, Sweden

[22] Filed: Jan. 15, 1975

[21] Appl. No.: 541,245

[30] Foreign Application Priority Data
Jan. 21, 1974 Sweden .............................. 7400735

[52] U.S. Cl. .................................. 165/4; 98/33 R
[51] Int. Cl.² ........................................ F28D 17/00
[58] Field of Search .................... 165/4, 10; 98/33 R

[56] References Cited
UNITED STATES PATENTS

| | | | |
|---|---|---|---|
| 3,756,310 | 9/1973 | Becker .............................. | 165/10 X |
| 3,830,145 | 8/1974 | Holt el al. ............................... | 98/33 |
| R17,577 | 2/1930 | Dyrssen .............................. | 165/4 X |

Primary Examiner—William E. Wayner
Assistant Examiner—William E. Tapolcai, Jr.
Attorney, Agent, or Firm—Ulle C. Linton

[57] ABSTRACT

A ventilation device for ventilating rooms in dwelling locations, or other spaces such as workman's barracks, cold storage and freezing rooms, and the like. An elongated housing is provided with a fan at one end with a reversible motor for controlling the direction of the fan. Heat holdover means comprising a series of heat-exchange plates is positioned in the housing and parallel to the direction of the air flow. Thermostats are provide at both ends of the housing for sensing the temperature of the air flowing by and thereby operating the reversible motor, thus controlling the direction of the fan.

4 Claims, 3 Drawing Figures

U.S. Patent  March 2, 1976  3,941,185
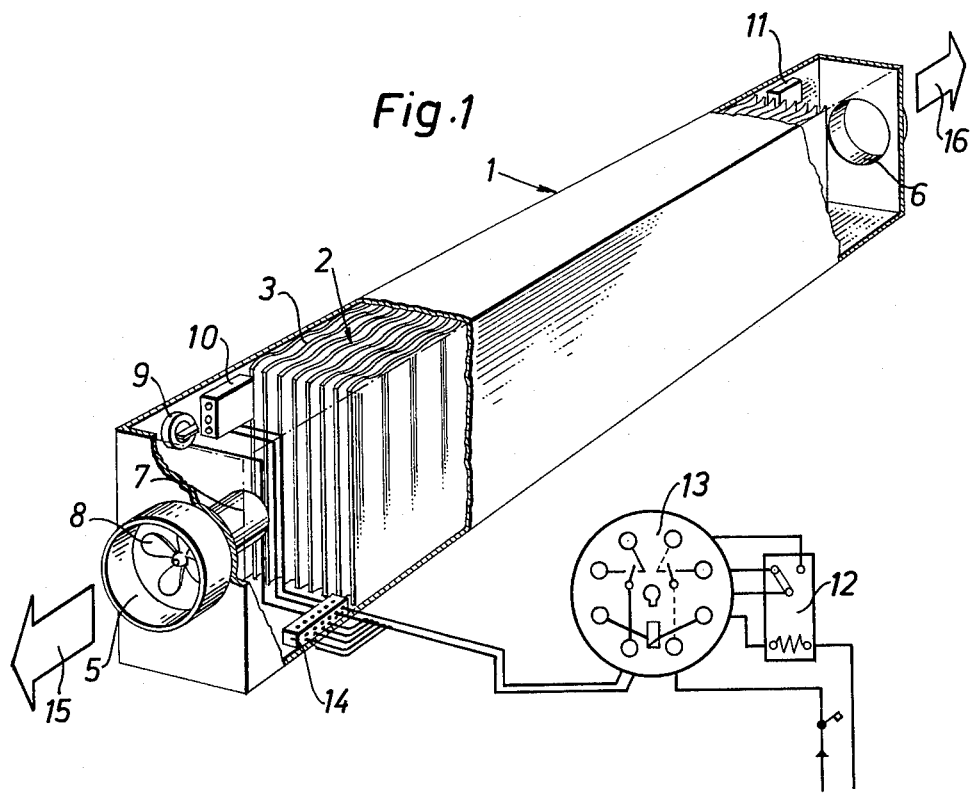
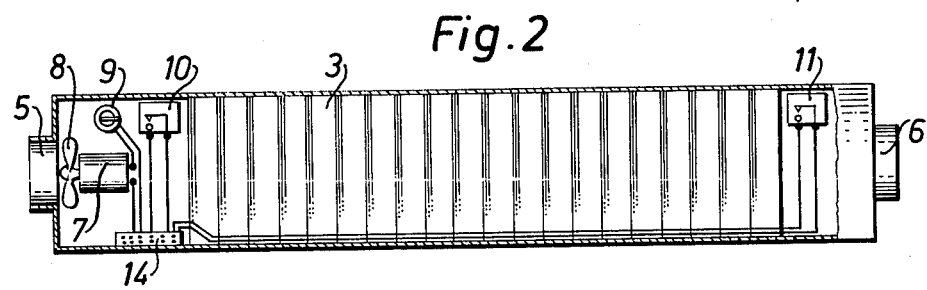
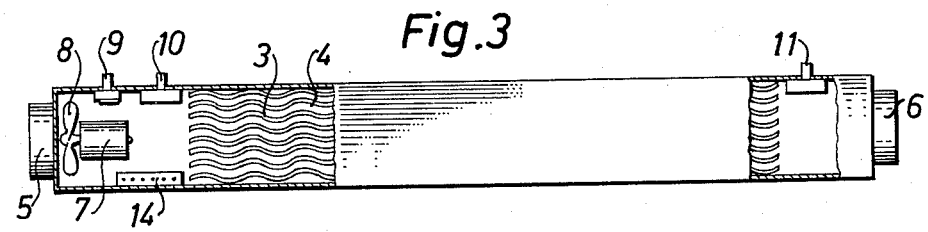

HEAT ACCUMULATOR

The present invention relates to a ventilation device primarily for ventilation of rooms in dwelling locations but also useful for ventilating other spaces such as workmens barracks, cold storage and, freezing rooms and the like. More specifically, the invention relates to a device of the type disclosed in the preamble of claim 1, which device alternately sucks air from and blows air into, respectively, a space.

In normal ventilation of for an example a flat or a smaller residential property a great deal of the heat required to maintain a certain temperature, is lost due to the fact that in venting the corresponding space cold air is sucked into and heated air disappears through the outlet air passages. The losses, hereby experienced, may be up to approximately 40 percent of the total heat losses in a building and thus, because of the presently increasing energy costs it is of great importance to minimize these losses.

By providing the device according to the present invention with the characteristics disclosed in the following claims the disadvantages mentioned above are eliminated along with other disadvantages experienced in hitherto known ventilation systems of self suction or central suction types or similar at the same as an effective ventilation system is obtained, which may be easily adjusted according to individual needs and desires. Further advantages gained by the device according to the invention will be apparent from the following description.

An examplifying embodiment of the device will be further described in the following with reference to the accompanying drawing, in which:

FIG. 1 is a perspective view of the device according to the invention,

FIG. 2 is a side view of the device with one side of the housing removed,

FIG. 3 is a view seen from above with the top portion of the housing removed.

In FIG. 1 reference numeral 1 designates a housing made from sheet metal or some other suitable material, and the housing may have the dimensions 100 × 200 × 1000 mm and comprises a package 2 including plates 3 located at a distance to each other and parallel to each other, and the plates — which in the shown embodiment amounts to a number of 20 with a thickness of 1 mm — preferably are folded or corrugated in such a manner that zig-zag shaped channels 4 are defined between the same. A suitable dimension of the channels is a width of approximately 4 mm (the distance between the plates) a height of approximately 200 mm (the height of the plates) and a length of approximately 1000 mm, but it is obvious that the dimensions of the plates may be varied within wide limits, however, they must be so dimensionated and located that the air flow, that is to pass through the channels, is forced to change the directions thereof several times while passing the channel and thus, the flow may never pass straight forward through the same. Sockets 5, 6 for the inlet or outlet of air are provided at the gable portions of the housing depending upon the direction of rotation of the fan 8, located at one of the sockets driven by an electric engine 7, in a way which will be further explained. The housing 1 also includes a rheostat 9 to adjust the speed of the fan engine together with two thermostats 10, 11 in connection with the ends of the package 2. An impulse relay 12 is connected to the device giving impulses to a reverser 13 for the direction of rotation of the engine 7, whereby the connection to the device is accomplished by a terminal block 14 and even the rest of the components are coupled to the same in a suitable manner to achieve the intended function of the device.

In order to more easily understand function of the device a working cycle of the same will be further described, whereby a starting point has been chosen the condition in which the device initially has the same temperature as the air in the room in which the device is to be used. The device thereby has the socket 6 directed away from the fan 8, is directly coupled to the exterior air which in this case is presumed to be much colder than the air in the room. Thereby, the fan 8 sucks air from the exterior through the socket 6 and blows the air into the room in the direction of the arrow 15 through the socket 5. Due to the shape of the channels the air is constantly forced to change the directions thereof during the passage through the package 2 and thereby is brought to contact with the surface of the plates 3 to pick up the heat that is stored in the plates 3. Hereby, these plates will succesively be cooled until they have reached approximately the same temperature as the air entering from the exterior, and it is to be specially noted that the cooling initially takes place at that end, located closest to the socket 6 in order to be cooled at the end located against the socket 5 after a relatively long time. When the cooling reaches the latter mentioned end the temperature of the outlet air will fall and the thermostat 10, when acted upon by the somewhat cooled air, will begin to function and closes a current circuitry, whereby the impulse relay 12 acts upon the reverser 13 to change the direction of rotation of the fan engine 7. Thereby, the thermostat 10 may suitably be set so that a cold draught will never occur in the ventilated space.

When the air flow changes its directions and thus flows in the opposite direction, i.e. the direction of the arrow 16, the package 2 — starting from the end located closest to the socket 5 — will be succesively heated to the temperature prevailing in the ventilated room at the same time as the thermostat 10 due to the surrounding heated air will return to the normal interrupted position thereof and thus, will be ready for a new closing function the next time it is cooled. When heat is stored in the package and the temperature in the end thereof located adjacent the socket 6 approaches approximately the temperature of the surrounding room the outlet air will also have the corresponding high temperature, which in turn results in that the thermostat 11, that is suitably set in a manner similar to the thermostat 10, closes a current circuitry which again changes the directions of rotation of the fan engine 7 via the relay 12 and the reverser 13 in such a manner that the fan will suck air at the socket 6 and blow said air into the space in the direction of the arrow 15 as disclosed above.

It is hereby to be noted that the air given to the room and of a temperature corresponding to the room temperature is only heated by the heat accumulated in the package 2 and, additional heat energy and, thus, not delivered during the working cycle of the device. The power consumption of the device in the described embodiment is approximately 1 mA for a working voltage of 12 volts (direct current) and thus the energy requirements and operational costs are so small that they may be almost fully left out of account while great energy savings are obtained from a heating point of view.

In order to further reduce the ventilation losses in spaces which are ventilated by the use of a device of the present invention two devices may be mounted in the same room, whereby the two devices may be so arranged that they operate with opposing airflow directions guided by the fan i.e. when the first device sucks air the second device blows air, and vice versa, or are of the devices may operate completely without a fan or any guiding means, which is specifically advantageous in smaller spaces, such as workmens barracks or the like. In certain cases it may be suitable to mount two devices side by side with the air flows directed away from each other by the blow out of each device, respectively, whereby one of the devices may be used without fan and guide means and the effect of the fan needs therefore not has to be reduced.

The device may also be used for ventilating cold storage and freezing spaces whereby the package 2 rather than accumulating heat accumulates cold and the thermostats in such an application are made suitable for the prevailing temperature differences. Furthermore the device may — such as in summer-time — be used exclusively to blow air inwardly from the outside or in premises generating a great amount of heat, exclusively to blow air outwardly whereby the capacity of the device thereby may be easily set by the aid of the rheostat 9.

Also the duration of the working cycle may be easily varied partly by means of different settings of the rheostat and partly by different settings of the two thermostats 10 and 11. The duration of the working cycle must not be either too long or too short and it has been shown that a suitable setting with a temperature difference of about 20°C, provides a reversal of the direction of the fan engine approximately every ninth minute and a temperature difference of about 40°C the reversal occurs approximately every sixth minute.

Naturally, the invention is not limited to the embodiment described and shown in the drawing, but may be varied in several ways within the scope of the following claims without departing from the spirit of the invention.

Thus, the dimensions may vary in such a manner that the buit-in length of devices, intended for smaller spaces, in only about 500–600mm, while the upper limit for the length of the device is only determined by practical considerations seen from mounting— and handling standpoints. Furthermore, the width of the devices may be increased, suitably in modules of 100 mm, while the height preferably may be in the order of about 200 mm as disclosed above but naturally under certain circumstances this may also be varied. Other variations may include that the thermostats are placed a distance into the package 2 seen from the ends thereof and that the package 2 rather than folded may comprise metal wool, some form of a liquid storage or the like rather than folded plates, however, thereby a considerably reduced storage capacity is obtained.

I claim:

1. A device for ventilating spaces such as dwelling rooms, workmens barracks, cold storage and freeze spaces and the like, which device includes a fan located in a housing provided with two sockets positioned at a distance to each other, means for reversing the direction of said for, characterized in that the housing, apart from the fan, comprises a package positioned between the sockets, heat holdover means including several plates provided at a distance to each other, elongated narrow channels being defined between the plates, whereby inlet or outlet air passes through these channels and thereby gives off heat or cold to the plates while the air after exchange of the directions of rotation of the fan passes in the opposite direction through the channels picks up the heat and the cold, respectively, stored in the plates and returns it to the ventilated space.

2. A device according to claim 1, characterized in that guiding means, comprising thermostats, are provided adjacent the ends of the package and the sockets to act upon a relay or a corresponding element, which in turn acts upon a reverser to change rotational directions of the fan engine.

3. A device according to claim 1, characterized in that the plates and thereby also the channels defined between the plates are folded or corrugated, whereby the air flow, passing through the channels, is forced to change directions several times during the passage thereof through the same and make more intimate contact with the plates in order to give off or pick up heat and cold, respectively.

4. A device according to claim 2, characterized in that a rheostat is provided to adjust the number of revolutions of the fan engine, whereby the capacity of the fan may be varied.

* * * * *